United States Patent
Patel et al.

(10) Patent No.: US 8,731,595 B2
(45) Date of Patent: May 20, 2014

(54) TRANSMISSION POWER MANAGEMENT FOR A MOBLIE DEVICE SUPPORTING SIMULTANEOUS TRANSMISSION ON MULTIPLE AIR INTERFACES

(75) Inventors: Shimman Arvind Patel, San Diego, CA (US); Gene Fong, San Diego, CA (US); Avneesh Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 339 days.

(21) Appl. No.: 12/774,579

(22) Filed: May 5, 2010

(65) Prior Publication Data

US 2010/0291963 A1     Nov. 18, 2010

Related U.S. Application Data

(60) Provisional application No. 61/178,374, filed on May 14, 2009.

(51) Int. Cl.
*H04B 7/005*     (2006.01)

(52) U.S. Cl.
USPC ............ 455/522; 455/69; 455/101; 455/13.4

(58) Field of Classification Search
USPC ........ 455/522, 69, 453, 101, 127.1, 450, 451, 455/452.1, 452.2, 456.1, 456.2, 572, 561, 455/509, 442, 439, 552.1, 13.4; 370/336, 370/335, 342, 310, 206, 260, 252, 311; 375/150, 232, 343
See application file for complete search history.

(56) References Cited

U.S. PATENT DOCUMENTS

| | | | |
|---|---|---|---|
| 5,838,800 A * | 11/1998 | Lowe et al. | 381/17 |
| 6,356,386 B1 * | 3/2002 | Denkin et al. | 359/337 |
| 6,374,085 B1 * | 4/2002 | Saints et al. | 455/69 |
| 6,411,817 B1 * | 6/2002 | Cheng et al. | 455/522 |
| 6,735,423 B1 * | 5/2004 | Uskali et al. | 455/249.1 |
| 6,876,868 B2 * | 4/2005 | Crocker et al. | 455/522 |
| 7,269,422 B2 * | 9/2007 | Gunnarsson et al. | 455/442 |
| 7,418,270 B2 * | 8/2008 | van Rensburg et al. | 455/522 |
| 7,444,162 B2 | 10/2008 | Hassan | |
| 7,450,539 B1 | 11/2008 | Camp | |
| 7,489,907 B2 | 2/2009 | Hasegawa et al. | |
| 2002/0131396 A1 | 9/2002 | Knuutila et al. | |
| 2002/0160800 A1 * | 10/2002 | Rozmaryn | 455/522 |

(Continued)

FOREIGN PATENT DOCUMENTS

| | | |
|---|---|---|
| JP | H1132007 A | 2/1999 |
| WO | WO-2007125570 A1 | 11/2007 |
| WO | WO2008155469 | 12/2008 |

OTHER PUBLICATIONS

International Search Report and Written Opinion—PCT/US2010/033926, International Search Authority—European Patent Office—Aug. 26, 2010.

(Continued)

*Primary Examiner* — Tan Trinh
(74) *Attorney, Agent, or Firm* — Charles E. Eggers

(57) ABSTRACT

Systems and methods for transmission power management for a mobile device supporting simultaneous transmission on multiple air interfaces are disclosed. In one embodiment, the method comprises determining a transmission power level for each air interface, comparing the transmission power levels to a threshold power level, and adjusting at least one of the transmission power levels based on said comparison.

12 Claims, 8 Drawing Sheets

(56) References Cited

U.S. PATENT DOCUMENTS

| | | |
|---|---|---|
| 2003/0002464 A1* | 1/2003 | Rezaiifar et al. ............... 370/336 |
| 2003/0002646 A1 | 1/2003 | Gutta et al. |
| 2003/0152135 A1* | 8/2003 | Cramer, III ................... 375/140 |
| 2004/0029605 A1 | 2/2004 | Schneider |
| 2004/0229605 A1 | 11/2004 | Hwang et al. |
| 2006/0040698 A1* | 2/2006 | Shiu et al. ...................... 455/522 |
| 2007/0013547 A1* | 1/2007 | Boaz ........................ 340/870.02 |
| 2007/0280377 A1* | 12/2007 | Rucki ........................... 375/296 |
| 2008/0004063 A1 | 1/2008 | Haapoja et al. |
| 2008/0013468 A1* | 1/2008 | Anigstein et al. ............. 370/310 |
| 2008/0070585 A1* | 3/2008 | Wu et al. ..................... 455/452.2 |
| 2008/0175207 A1* | 7/2008 | Lee et al. ....................... 370/337 |
| 2008/0188256 A1* | 8/2008 | Wu et al. ........................ 455/522 |
| 2008/0233995 A1* | 9/2008 | Shiu et al. ...................... 455/522 |
| 2008/0253351 A1 | 10/2008 | Pernu et al. |
| 2010/0118747 A9* | 5/2010 | Anigstein et al. ............. 370/310 |
| 2010/0122008 A1* | 5/2010 | Goss et al. ..................... 710/264 |
| 2010/0291884 A1* | 11/2010 | Hu et al. ........................ 455/101 |
| 2011/0142150 A1* | 6/2011 | Anigstein et al. ............. 375/260 |
| 2012/0129573 A1* | 5/2012 | Rofougaran .................. 455/553.1 |
| 2012/0213112 A1* | 8/2012 | Olgaard et al. ................ 370/252 |
| 2012/0295670 A1* | 11/2012 | Rofougaran ................... 455/572 |
| 2013/0310116 A1* | 11/2013 | Rofougaran ................... 455/572 |

OTHER PUBLICATIONS

Taiwan Search Report—TW099115549—TIPO—Mar. 22, 2013.

* cited by examiner

TRANSMISSION POWER MANAGEMENT FOR A MOBLIE DEVICE SUPPORTING SIMULTANEOUS TRANSMISSION ON MULTIPLE AIR INTERFACES

CROSS-REFERENCE TO RELATED APPLICATIONS

This application claims priority under §119(e) to U.S. Provisional Application No. 61/178,374, entitled "TRANSMISSION POWER MANAGEMENT FOR A MOBILE DEVICE SUPPORTING SIMULTANEOUS TRANSMISSION ON MULTIPLE AIR INTERFACES," filed May 14, 2009, which is hereby incorporated by reference in its entirety.

BACKGROUND OF THE INVENTION

1. Field of the Invention

The present invention generally relates to communication networks and systems. In particular, the present invention relates to systems and methods for power management for a mobile device supporting simultaneous transmission on multiple air interfaces.

2. Description of the Related Art

Many forms of wireless communication systems and networks are used to transmit various forms of data including, but not limited to, voice, video, multimedia, and packet data. In some cases a mobile device that communicates on such a network supports transmission over multiple air interfaces (e.g., 1×, 1×Advanced, EV-DO, UMTS (HSPA+), GSM, GPRS, EDGE, LTE etc.). During transmission the mobile device may need to have a specific absorption rate (SAR) at or below a particular level to be compliant regulations. This often implies that the overall transmit power of the mobile device should be restricted to a specific power level based on the device usage (i.e. handheld, held up to the head, etc.). Conventionally, mobile devices only transmit over one air interface at a time and art related to conventional systems therefore does not describe adjusting transmit power for a mobile device supporting simultaneous transmission on multiple air interfaces where the overall transmit power is the sum of the transmit power levels for each air interface. Thus, it is desirable to ensure SAR compliance and optimize overall throughput on a mobile device supporting simultaneous transmission on multiple air interfaces.

SUMMARY OF THE INVENTION

The systems, methods, and devices of the present invention each have several aspects, no single one of which is necessarily responsible for its desirable attributes. Without limiting the scope of this invention as expressed by the claims which follow, some of its features are discussed briefly below. After considering this discussion, and particularly after reading the section entitled "Detailed Description of Certain Embodiments," one will appreciate advantageous features of this invention, including concurrent communication over multiple air interfaces.

One aspect of the present invention is a method of power management for a mobile device supporting simultaneous transmission on multiple air interfaces, the method comprising determining a first power level used for transmission over a first air interface, determining a second power level used for transmission over a second air interface, comparing a composite of the first power level and the second power level to a threshold power level, and adjusting the second power level based on the comparison.

Another aspect of the present invention is a method of power management for a mobile device supporting simultaneous transmission on multiple air interfaces, the method including determining a first power level used for transmission over a first air interface, determining a second power level used for transmission over a second air interface, generating a first power-based payload constraint based on the first power level, generating a second power-based payload constraint based on the first power level, and transmitting the first and the second power-based payload constraints.

Another aspect of the present invention is a method of power management for a mobile device supporting simultaneous transmission on multiple air interfaces, the method including determining a first power level used for transmission over a first air interface, generating a power-based payload constraint based on the first power level, adjusting the power-based payload constraint based on at least a second power level used for transmission over a second air interface, and transmitting the power-based payload constraint.

Another aspect of the present invention is a mobile device supporting simultaneous transmission on multiple air interfaces, the mobile device including a first interface power calculator configured to determine a first power level used for transmission over a first air interface, a second interface power level calculator configured to determine a second power level used for transmission over a second air interface, a threshold check unit configured to compare a composite of the first power level and the second power level to a threshold power level, and a power controller configured to adjust the second power level based on the comparison.

Another aspect of the present invention is a mobile device supporting simultaneous transmission on multiple air interfaces, the mobile device including a first interface power calculator configured to determine a first power level used for transmission over a first air interface; a second interface power level calculator configured to determine a second power level used for transmission over a second air interface; a power-based payload constraint generator configured to generate a first power-based payload constraint based on the first power level, and to generate a second power-based payload constraint based on the first power level; and a transceiver configured to transmit the first and the second power-based payload constraints.

Another aspect of the present invention is a mobile device supporting simultaneous transmission on multiple air interfaces, the mobile device including a first interface power calculator configured to determine a first power level used for transmission over a first air interface; a power-based payload constraint generator configured to generate a power-based payload constraint based on the first power level, and to adjust the power-based payload constraint based on at least a second power level used for transmission over a second air interface; and a transceiver configured to transmit the power-based payload constraint.

Another aspect of the present invention is a computer program product, including computer-readable media storing code for causing a computer to determine a first power level used for transmission over a first air interface, to determine a second power level used for transmission over a second air interface, to compare a composite of the first power level and the second power level to a threshold power level, and to adjust the second power level based on the comparison.

Another aspect of the present invention is a computer program product, including computer-readable media storing code for causing a computer to determine a first power level used for transmission over a first air interface, to determine a second power level used for transmission over a second air interface, to generate a first power-based payload constraint based on the first power level, to generate a second power-based payload constraint based on the first power level, and to transmit the first and the second power-based payload constraints.

Another aspect of the present invention is a computer program product, including computer-readable media storing code for causing a computer to determine a first power level used for transmission over a first air interface, to generate a power-based payload constraint based on the first power level, to adjust the power-based payload constraint based on at least a second power level used for transmission over a second air interface, and to transmit the power-based payload constraint.

Another aspect of the present invention is a system for power management for a mobile device supporting simultaneous transmission on multiple air interfaces, the system including means for determining a first power level used for transmission over a first air interface, means for determining a second power level used for transmission over a second air interface, means for comparing a composite of the first power level and the second power level to a threshold power level, and means for adjusting the second power level based on the comparison.

Another aspect of the present invention is a system for power management for a mobile device supporting simultaneous transmission on multiple air interfaces, the system including means for determining a first power level used for transmission over a first air interface, means for determining a second power level used for transmission over a second air interface, means for generating a first power-based payload constraint based on the first power level, means for generating a second power-based payload constraint based on the first power level, and means for transmitting the first and the second power-based payload constraints.

Another aspect of the present invention is a system for power management for a mobile device supporting simultaneous transmission on multiple air interfaces, the system including means for determining a first power level used for transmission over a first air interface, means for generating a power-based payload constraint based on the first power level, means for adjusting the power-based payload constraint based on at least a second power level used for transmission over a second air interface, and means for transmitting the power-based payload constraint.

DETAILED DESCRIPTION OF CERTAIN EMBODIMENTS

Figure 1:
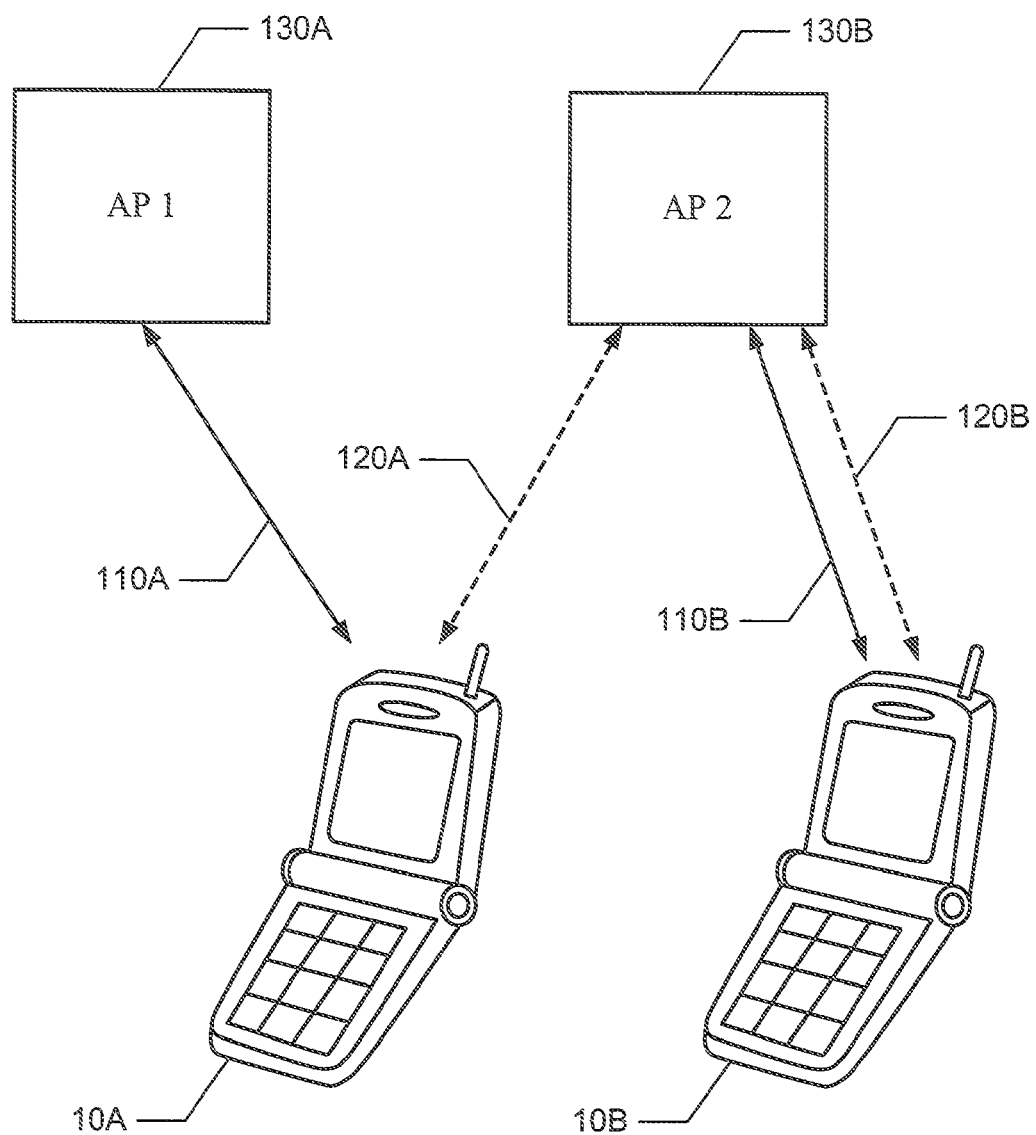
FIG. 1 is a diagram illustrating an example wireless communication device engaged in simultaneous communication over two air interfaces.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Methods and devices are described herein relating to transmission power management for a mobile device supporting simultaneous transmission on multiple air interfaces. The described embodiments are related to wireless communication devices that transmit over two air interfaces. However, one of ordinary skill in the art will recognize that similar methods and devices may be used to support transmission over more than two air interfaces.

Some embodiments of wireless communication devices described herein are configured to transmit over multiple air interfaces simultaneously. For example, a wireless communication device may communicate voice over a first air interface (e.g., 1×) and data only over a second air interface (e.g., EV-DO). Transmitting the voice over the first interface may require the voice signal be amplified to a first power level, where the first power-level may be chosen in order to maintain a certain level of voice quality. Setting the first power, level to a higher power may result in a stronger signal sent by the wireless communication device, which in turn may be less susceptible to errors and therefore result in a higher quality received voice signal (e.g., less noise).

Accordingly, higher transmit power levels for each air interface may be beneficial. However, the wireless communication device may be constrained to an overall power level available for transmission over both the first and second air interfaces. For example, the overall power level may be constrained by regulations requiring the wireless communication device to have a specific absorption rate (SAR) at or below a particular level. Accordingly, methods and devices are described herein for managing the overall power level used for transmission over multiple air interfaces by a wireless communication device.

Transmission over the multiple air interfaces may be divided into frames or subframes. In some embodiments the methods described herein may be used to allocate power between multiple air interfaces for each frame or subframe individually. In other embodiments, the methods may be used to allocate power for multiple frames or subframes.

FIG. 1 is a diagram illustrating a wireless communication device engaged in simultaneous communication over two air interfaces. The wireless communication devices 10A, 10B can simultaneously establish a first air interface 110A, 110B and a second air interface 120A, 120B. In one embodiment, the first air interface 110A, 110B is established at a first channel defined by a first frequency or frequency band, and the second air interface 120A, 120B is established at a second channel defined by a second frequency or frequency band different from the first frequency or frequency band.

As shown in the example depicted in FIG. 1, a wireless communication device 10A establishes air interfaces 110A, 120A with different access points (AP1 and AP2) 130A, 130B. That is, a first air interface 110A is established with an access point (AP1) 130A and a second air interface 120A with an access point (AP2) 130B. A wireless communication device 10B is shown as having established air interfaces 110B, 120B with a single access point (AP2) 130B.

In an example embodiment, the first air interface 110A, 110B supports 1xRTT traffic and the second air interface 120A, 120B supports EV-DO traffic (EV-DO, EV, and DO are abbreviations for Evolution-Data Only). 1xRTT, also known as 1x, 1xRTT, and IS-2000, is an abbreviation of 1 times Radio Transmission Technology. Both 1xRTT and EV-DO are telecommunications standards for the wireless transmission of data through radio signals maintained by 3GPP2 ($3^{rd}$ Generation Partnership Project), which are considered types of CDMA2000 (Code Division Multiple Access 2000).

In other embodiments, the first air interface 110A, 110B or the second air interface 120A, 120B can support 1xAdvanced, DO (Release 0, Revision A or B), UMTS (HSPA+), GSM, GPRS, and EDGE technologies.

Figure 2:
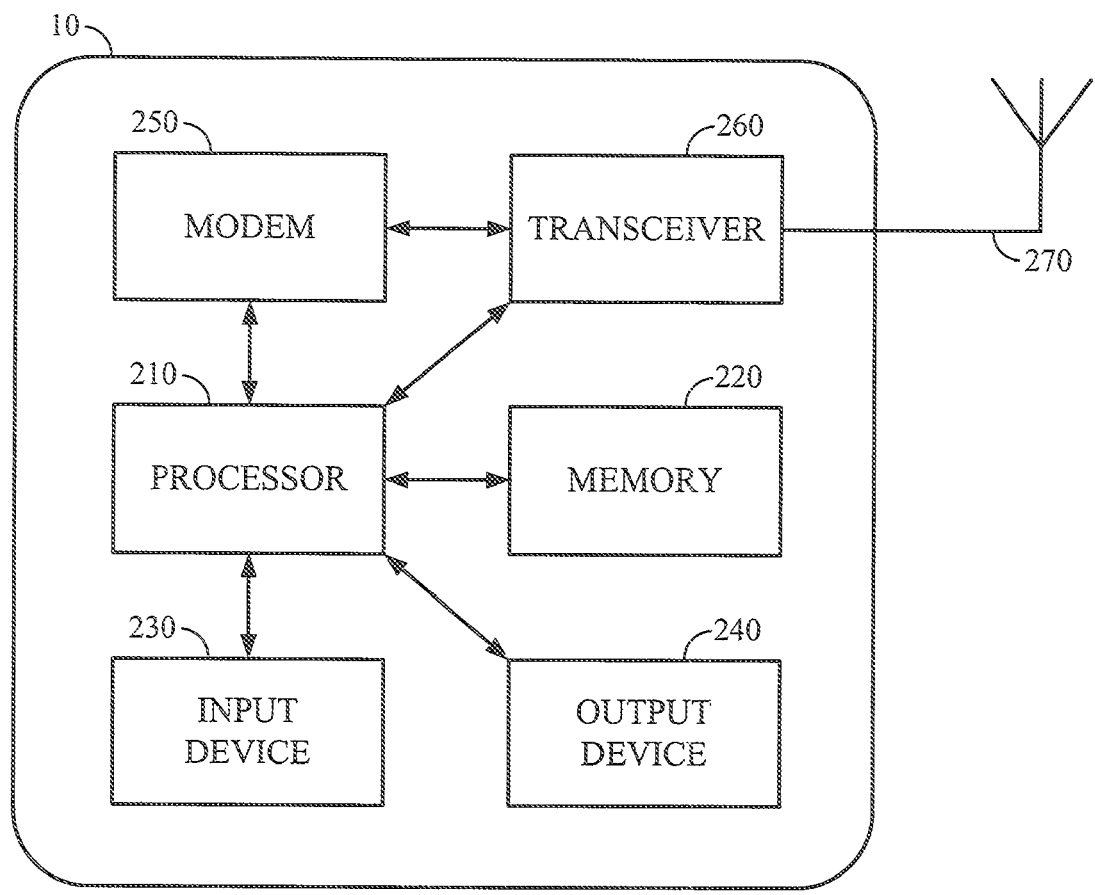
FIG. 2 is a functional block diagram of an example wireless communication device.

FIG. 2 is a functional block diagram of an example wireless communication device 10. The wireless communication device 10 includes a processor 210 in data coupled with a memory 220, an input device 230, and an output device 240. The processor is further in data communication with a modem 250 and a transceiver 260. The transceiver 260 is also in data communication with the modem 250 and an antenna 270. Although described separately, it will be appreciated that functional blocks described with respect to the wireless communication device 10 need not be separate structural elements. For example, the processor 210 and memory 220 may be embodied in a single chip. Similarly, two or more of the processor 210, modem 250, and transceiver 260 may be embodied in a single chip. Other integrations of the various functional blocks are possible.

The processor 210 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 210 can be coupled, via one or more buses, for example, to read information from or write information to memory 220. The processor may additionally contain memory such as processor registers. The memory 220 may include a processor cache, including a multi-level hierarchical cache in which different levels have different capacities and access speeds. The memory 220 can also include a storage medium such as a random access memory (RAM), and other storage media including volatile storage devices and non-volatile storage devices. Such storage media can include one or more of a medium such as a hard drive, an optical disc, such as a compact disc (CD) or digital video disc (DVD), a flash memory, floppy disc, magnetic tape, and Zip drive.

The processor 210 may be coupled to an input device 230 and an output device 240 for, respectively, receiving input from and providing output to, a user of the wireless communication device 10. Examples of input devices include, but are not limited to, a keyboard, buttons, keys, switches, a pointing device, a mouse, a joystick, a remote control, an infrared detector, a video camera (possibly coupled with video processing software to, e.g., detect hand gestures or facial gestures), a motion detector, or a microphone (possibly coupled to audio processing software to, e.g., detect voice commands). Suitable output devices include, but are not limited to, visual output devices, including displays and printers, audio output devices, including speakers, headphones, earphones, and alarms, and haptic output devices, including force-feedback game controllers and vibrating devices.

The processor 210 may be further coupled to a modem 250 and a transceiver 260. The modem 250 and transceiver 260 prepare data generated by the processor 210 for wireless transmission via the antenna 270 according to one or more air interface standards. The modem 250 and transceiver 260 also demodulate data received via the antenna 270 according to one or more air interface standards. The transceiver typically includes a transmitter and a receiver. In other embodiments, the transmitter and receiver are separate components. The modem 250 and transceiver 260 can be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein.

Figure 3:
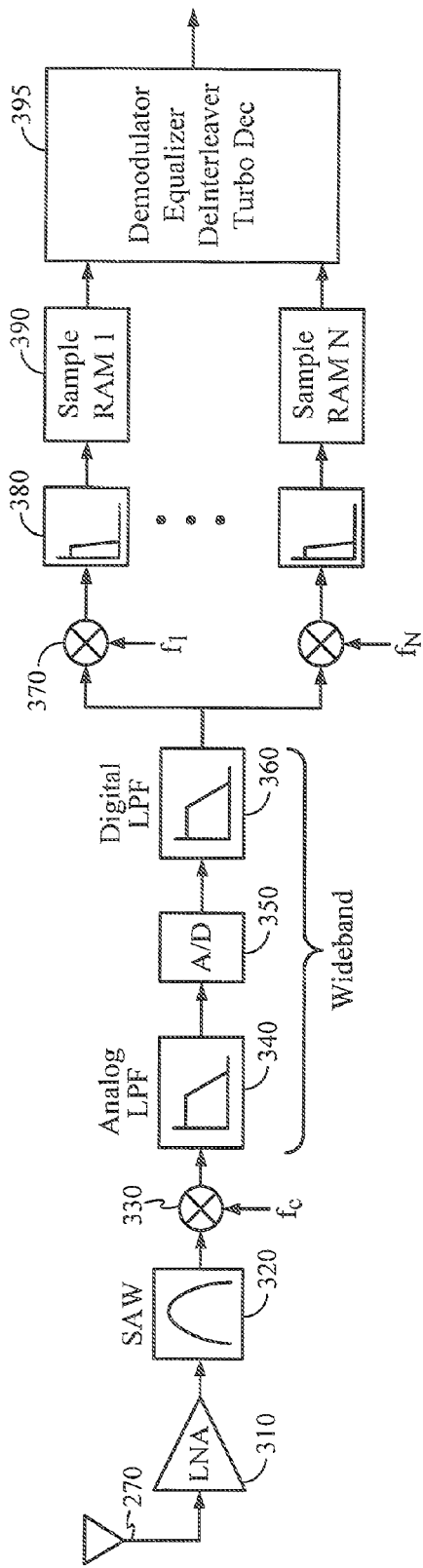
FIG. 3 is a functional block diagram of an example receiver of a wireless communication device.

FIG. 3 is a functional block diagram of an example receiver of a wireless communication device, including a receiver portion of the transceiver 260 depicted in FIG. 2. A signal received on the antenna 270 is amplified by a low-noise amplifier 310. Depending on the particular embodiment, the amplified signal then passes through a SAW (surface acoustic wave) filter 320. A SAW filter is an electromechanical device in which electrical signals are converted into a mechanical wave in a device constructed of a piezoelectric crystal or ceramic. The mechanical wave is delayed as it propagates across the device before being converted back into an electric signal by electrodes. The delayed outputs are recombined to produce a direct analog implementation of a finite impulse response filter. The signal is then multiplied by a center frequency $f_c$ at a multiplier 330, generating a base-banded signal. The base-banded signal is then passed through an analog low-pass filter 340, converted to a digital signal at an analog-to-digital converter 350, and filtered again with a digital low-pass filter 360.

The signal is then split into N multiple paths, where N is at least 2. Each signal in each path is multiplied by a different frequency $f_1$-$f_N$ at a multiplier 370 and passed through an appropriate filter 380 before being sampled with a sampler 390 (Sample RAM 1-N). Further processing, including demodulation, equalization, deinterleaving, and error correction coding, can be performed in a processing module 395, or the modem 250 or processor 210 shown in FIG. 2.

Figure 4:
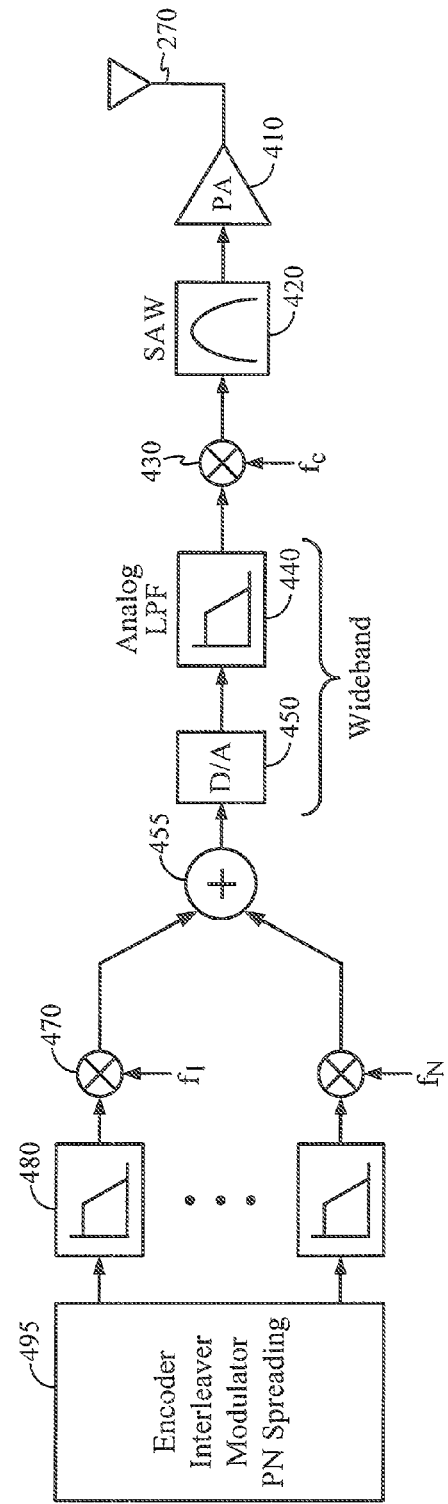
FIG. 4 is a functional block diagram of an example transmitter of a wireless communication device.

FIG. 4 is a functional block diagram of an example transmitter of a wireless communication device, including a transmitter portion of the transceiver 260 depicted in FIG. 2. In some embodiments, the various blocks may be implemented as software and/or firmware. The function of the transmitter is similar to that of the receiver, but generally in reverse. In an embodiment, data generated by the processor 210 of FIG. 2 may be subject to preliminary processing in a processing module 495, the modem 250, or the processor 210 itself. The data for each channel (channels 1-N are shown) are passed through an appropriate filter 480 before being modulated at a multiplier 470. The modulated signals in each channel are combined at an adder 455 and converted into an analog signal at a digital-to-analog converter 450. The analog signal is passed through an analog low-pass filter 440 before being modulated to a center frequency at a multiplier 430. The modulated signal may optionally be passed through a SAW filter 420 and/or a power amplifier 410 for transmission via the antenna 270.

Figure 5:
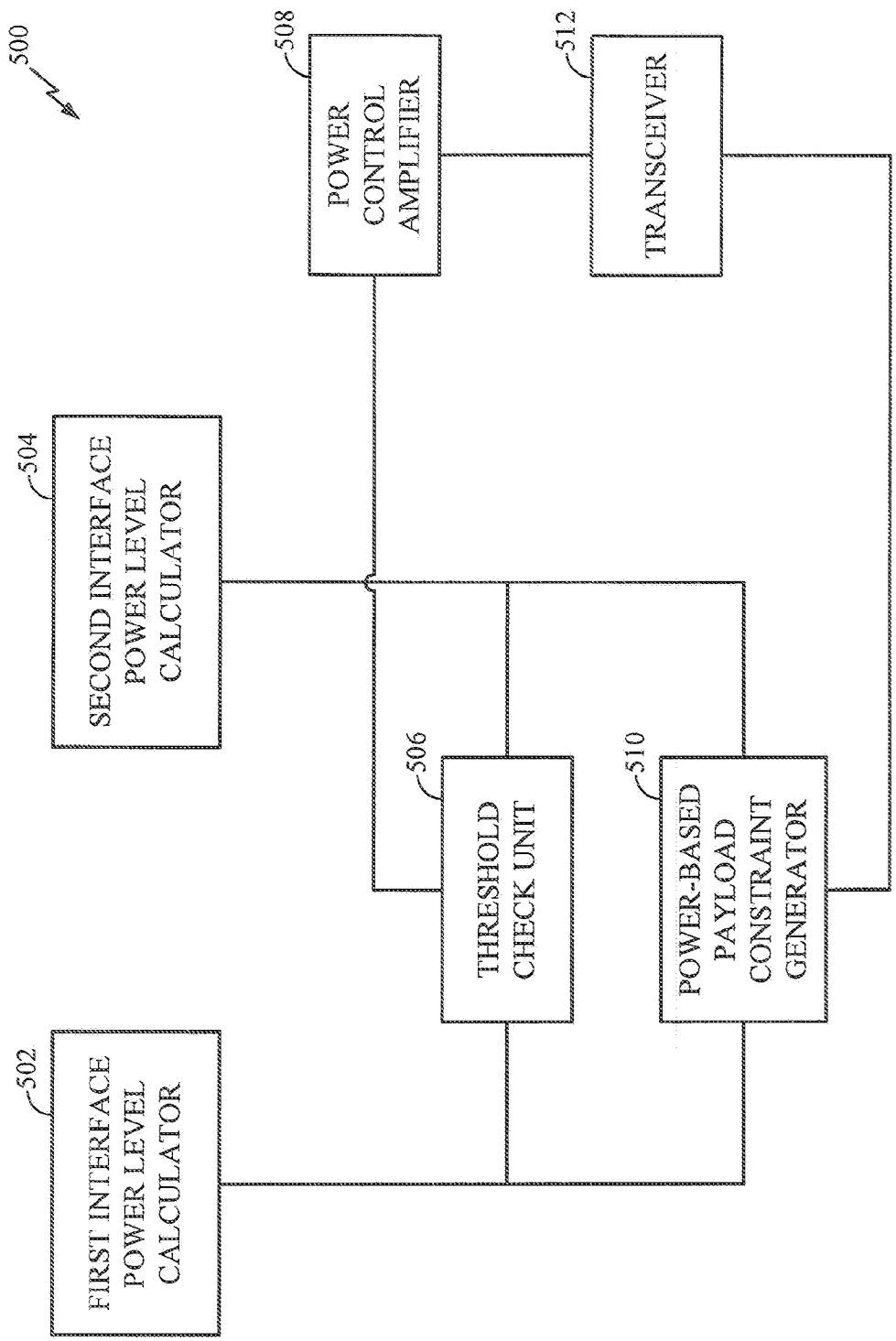
FIG. 5 is a functional block diagram of an example wireless communication device.

FIG. 5 is a functional block diagram of an example wireless communication device. In some embodiments, the various blocks may be implemented as software and/or firmware. As shown, the wireless communication device 500 includes a first interface power level calculator 502. In an embodiment, the first interface power level calculator 502 calculates a first power level used for transmission over the first air interface. The wireless communication device 500 may also include a second interface power level calculator 504. In an embodiment, the second interface power level calculator 504 calculates a second power level used for transmission over the second air interface. Both the first interface power level calculator 502 and the second interface power level calculator 504 may be in data communication with a threshold check unit 506. Threshold check unit 506 may be configured to determine whether transmission at the first power level over the first air interface and transmission over the second power level over the second interface would cause the total transmission power to exceed a threshold value. In an embodiment, the threshold value is based on a SAR limit. It will be appreciated that threshold values according to other limitations are possible. Threshold check unit 506 may also be in data communication with power controller/amplifier 508. Power controller/amplifier 508 may be configured to adjust the first power level, the second power level, or both the first and second power levels. Power controller/amplifier 508 may be in data communication with transceiver 512. Transceiver 512 may be similar to transceiver 260.

In an embodiment, wireless communication device 500 includes a power-based payload constraint generator 510. Both the first interface power level calculator 502 and the second interface power level calculator 504 may also be in data communication with power-based payload constraint generator 510. In an embodiment, power-based payload constraint generator 510 generates a power-based payload constraint (PBPC) (e.g., a power headroom report (PHR)). Power-based payload constraint generator 510 may also be in data communication with transceiver 512. The PBPC may include information indicative of the power levels calculated for the first interface and the second interface. In an embodiment, the power-based payload constraint generator 510 generates a single PBPC for both the first interface and the second interface. In another embodiment, the power-based payload constraint generator 510 generates a first PBPC for the first interface and a second PBPC for the second interface. In one embodiment, the power-based payload constraint generator generates the PBPC only when there is an adjustment to the power level used by either the first interface or the second air interface. In another embodiment, the power-based payload constraint generator generates the PBPC at regular time intervals. In yet another embodiment, the power-based payload constraint generator generates the PBPC after certain other events occur (e.g., when a data packet is to be transmitted). The transceiver 512 may be used to transmit the PBPC to one or more access points as discussed below.

It will be appreciated that other embodiments of a wireless communication device 500 may include additional modules, or may not include all of the modules shown in FIG. 5.

Figure 6:
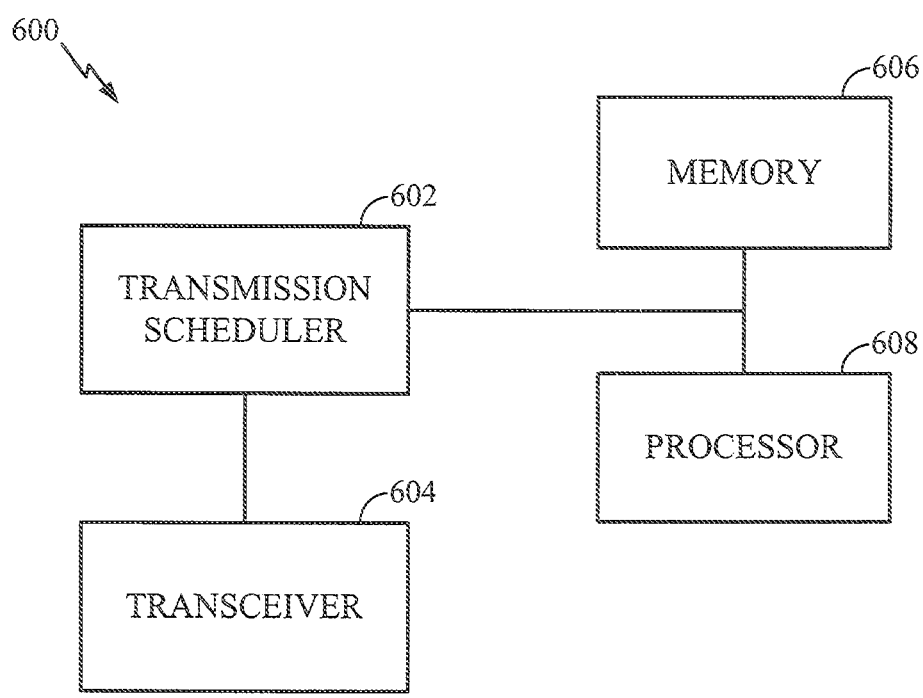
FIG. 6 is a functional block diagram of an example access point.

FIG. 6 is a functional block diagram of an example access point 600. The access point 600 includes a transmission scheduler 602 in data communication with a transceiver 604, a memory 606, and a processor 608. Further, memory 606 may be in data communication with processor 608. In an embodiment, transmission scheduler 602 may be configured to transmit scheduling of transmissions from a wireless communication device 500. Access point 600 may receive a PBPC at transceiver 604 and transmission scheduler 602 may schedule transmission over a first air interface and a second air interface by wireless communication device 500.

The memory 606 may include a processor cache, including a multi-level hierarchical cache in which different levels have different capacities and access speeds. The memory 606 can also include a storage medium such as a random access memory (RAM), and other storage media including volatile storage devices and non-volatile storage devices. Such storage media may include one or more of a medium such as a hard drive, an optical disc, such as a compact disc (CD) or digital video disc (DVD), a flash memory, floppy disc, magnetic tape, and Zip drive.

It will be appreciated that other embodiments of an access point may include additional modules or may not include all of the modules shown in FIG. 6.

Figure 7:
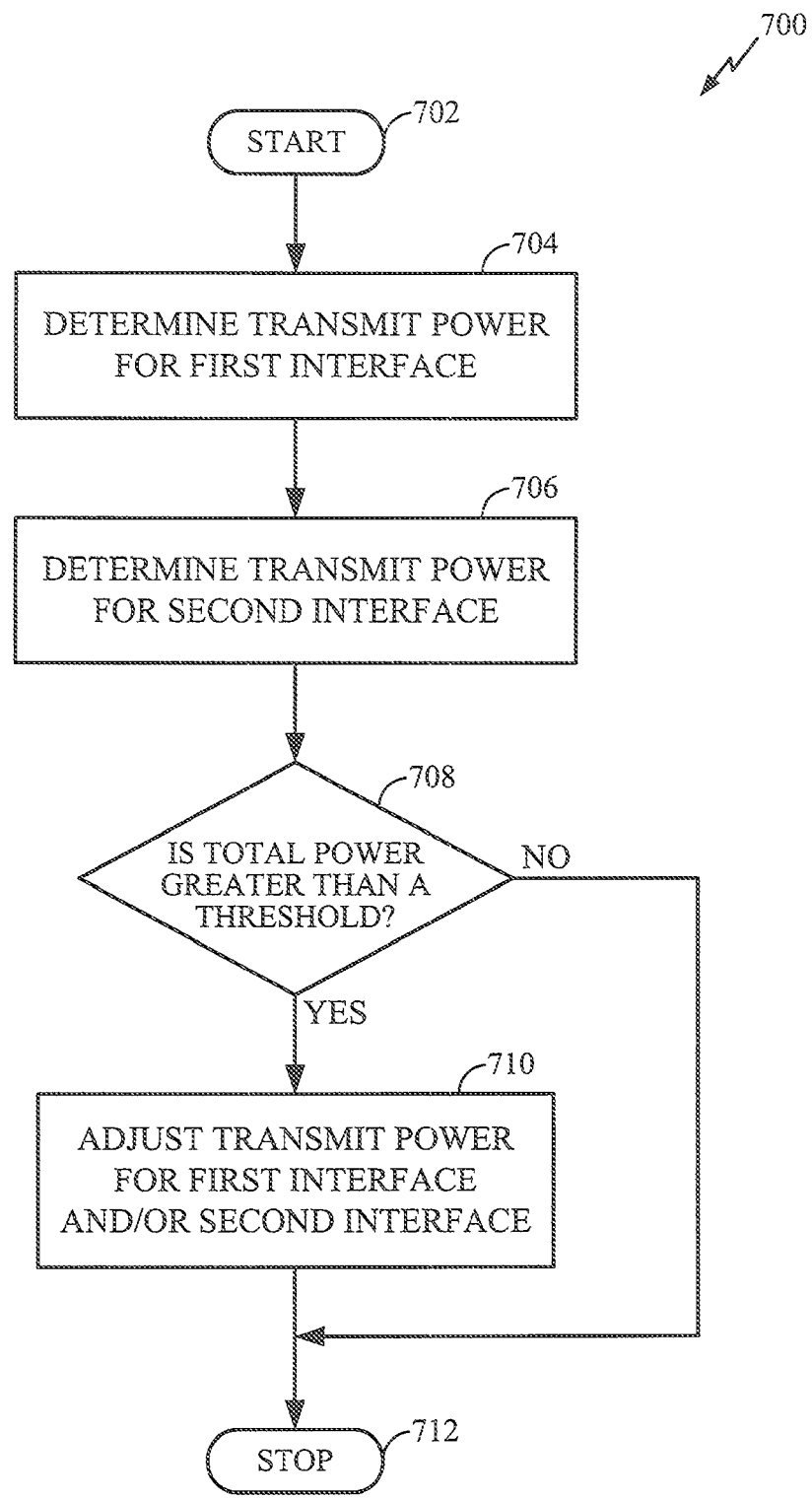
FIG. 7 is a flowchart of an example process of adjusting transmit power levels for multiple air interfaces.

FIG. 7 is a flowchart depicting an example embodiment of a process of adjusting transmit power levels for multiple air interfaces. In an embodiment, process 700 may be performed by various components of wireless communication device 500. The following description is of process 700 with respect to one embodiment of wireless communication device 500. It will be appreciated that process 700 may be performed by other wireless communication devices, and further that process 700 may be performed by one or more components other than those described below.

Process 700 starts at block 702. At block 704, the first interface power level calculator 502 determines a first power level used for transmission over the first air interface. At block 706, a second power level used for transmission over the second air interface is determined. In an embodiment, second interface power level calculator 504 calculates the second power level used for transmission over the second air interface. At block 708, threshold check unit 506 determines if a total power required for transmitting over the first air interface and the second air interface is greater than a threshold value. In an embodiment, the total power required is the sum of the first power level used for transmission over the first air interface and the second power level used for transmission over the second air interface. In another embodiment, the threshold value is based on a total transmit power required to achieve a particular SAR limit.

If at block 708 it is determined that the total transmit power required is not greater than the threshold value, no power adjustment is made to the power levels. Accordingly, the first power level is used for transmission over the first air interface and the second power level is used for transmission over the second air interface by power controller/amplifier 508. The process stops at block 712.

If at block 708 it is determined that the total transmit power required is greater than the threshold value, process 700 continues to block 710. At block 710, the first power level used for transmission over the first air interface and/or the second power level used for transmission over the second air interface is adjusted. In an embodiment, the power controller/amplifier 508 adjusts the first power level used for transmission over the first air interface and/or the second power level used for transmission over the second air interface such that the total transmit power is not greater than the threshold value. Various examples of power adjustment schemes that may be used are described below.

In an embodiment, the first air interface is the preferred air interface. The allocation of resources for the first air interface may take priority over the second air interface. That is, if the composite of the first and second power levels for transmission over the first air interface and the second air interface exceeds the total transmit power available, the power level of the second air interface may be clipped first. The first power level of the first air interface is clipped when the total transmit power available is less than the first power level.

If the first power level for the first air interface is V, the chosen power level for the second air interface is D, and the overall power available is Y, the power is allocated as follows. When $V+D \leq Y$, then the first air interface may be allocated a power level of V, and the second air interface may be allocated a power level of D. When $V+D>Y$ and $V<D$, then the first air interface may be allocated V, and the second air interface may be allocated Y-V. When $V+D>Y$ and $V \geq Y$, then the first air interface may be allocated the entire power level Y available. In an, power levels V, D, and Y may be determined as time averaged power over a time period T. The average power levels of V+D would therefore be limited to Y over the time period T.

In another embodiment, both the first power level and the second power level may be clipped such that the total transmit power does not exceed the total transmit power available. The power levels may be clipped equally, proportionally, or by some other method. The first power level, the second power level, and the total transmit power available may also be calculated as time averaged power over a time period T or as instantaneous power levels.

Figure 8:
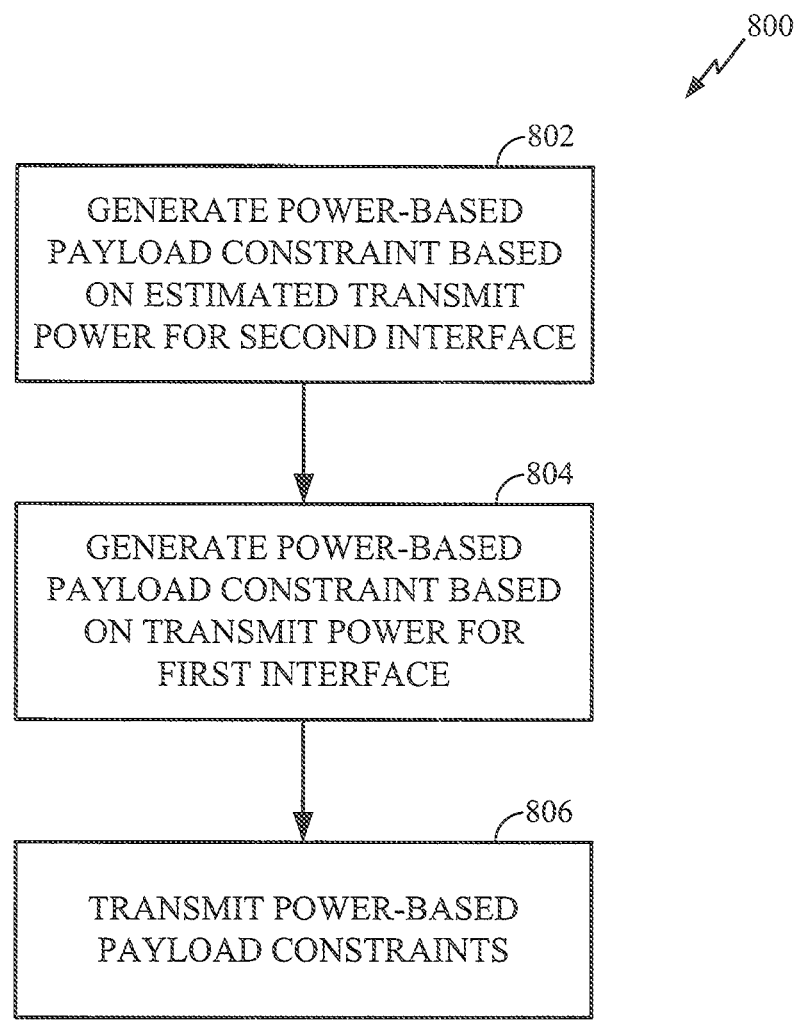
FIG. 8 is a flowchart of an example process of generating power-based payload constraints for a wireless communication device

FIG. 8 is a flowchart of an example of a process 800 of generating power-based payload constraints for a wireless communication device. In some embodiments, the process 800 may be performed by various components of wireless communication device 500. The following description is of process 800 with respect to one embodiment of wireless communication device 500. It will be appreciated that process 800 may be performed by other wireless communication devices, and that process 800 may be performed by one or more components other than those described below.

At a block 802, PBPC generator 512 generates a first PBPC based on an estimated power level needed for an uplink power transmission over a second air interface. Generally, an uplink is a communication link for transmission from the wireless communication device to an access point, and a downlink is a communication link for transmission from an access point to the wireless communication device. In an embodiment, the first PBPC is the estimated power level needed for an uplink power transmission over the second air interface. In an embodiment, the first PBPC may be calculated using the formula:

$$\text{PBPC} = P_{MAX} - \text{Ovrhd}, \quad (1)$$

where
Pmax=the total transmit power available; and
Ovrhd=a transmission overhead for transmitting data on the second air interface (e.g., power needed to send additional signal parameters besides the actual voice or data being communicated over the second air interface).

In another embodiment, the first PBPC may be calculated using the formula:

$$\text{PBPC} = P_{MAX} - \{10 \log(M_{PUSCH}) + P_{o\_PUSCH}(j) + a(j) \\ * PL + D_{TF}(i) + f(i)\}, \quad (2)$$

where
Pmax=the total transmit power available;
$M_{PUSCH}(i)$=the physical uplink share channel bandwidth (PUSCH BW) for a given subframe i;
$P_{o\_PUSCH}(j)$=sum of cell specific and wireless communication device specific power offsets based on whether uplink (UL) grant is semi-persistent (j=0), dynamic (j=1), or random access response (j=2), wherein the values are configured by UL signaling;
$a(j) \in [0, 0.4, 0.5, 0.6, 0.7, 0.8, 0.9, 1]$ for j=0, 1; a(j)=1 for j=2;
PL=downlink pathloss estimate, which is a function of downlink reference signal received power (RSRP) measurement;
$D_{TF}(i) = 10 \log 10(2^{MPR*1.25}-1)$ where MPR=bits/resource element for data transmission; and
$f(i)=f(i-1)+d_{PUSCH}(i-4)$ for frequency division duplex (FDD) accumulation mode and $d_{PUSCH}$ is the wireless communication device specific correction value conveyed by UL signaling.

At block 804, PBPC generator 512 generates a second PBPC based on the first power level used for transmission over the first air interface. In an embodiment, the second PBPC indicates the first power level used for transmission over the first air interface. In another embodiment, the second PBPC is the first power level used for transmission over the first air interface. Next, at block 806, transceiver 512 transmits the first PBPC and the second PBPC to one or more access points.

In an embodiment, access point 600 receives the first and second PBPC. Transmission scheduler 602 may then select uplink scheduling parameters based on the received first and second PBPC. The access point 600 may then transmit the transmission schedule and/or uplink schedule parameters to the wireless communication device that sent the first and second PBPC. Accordingly, the schedule indicates the power level and timing of when the wireless communication device should transmit to the access point. The schedule may be set such that the overall transmit power for transmitting over the first air interface and the second air interface does not exceed a threshold level as described with respect to FIG. 7.

Figure 9:
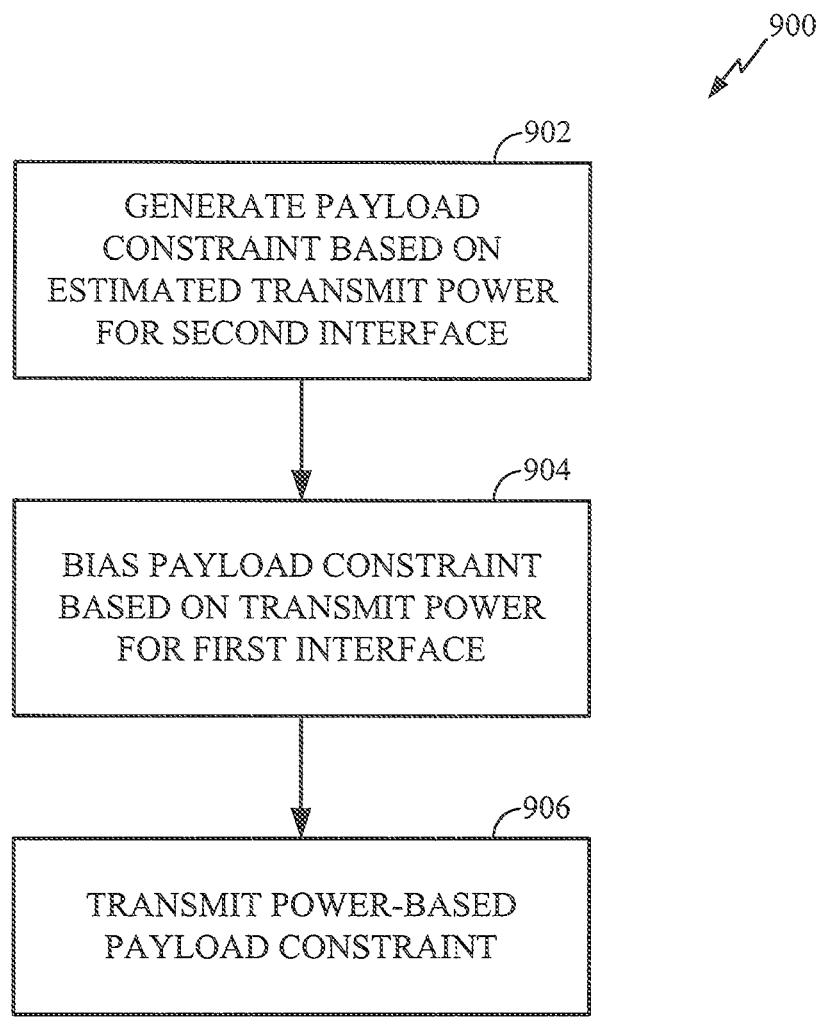
FIG. 9 is a flowchart of an example process of generating a biased power-based payload constraint for a wireless communication device.

FIG. 9 is a flowchart of an example process of generating a biased power-based payload constraint for a wireless communication device. In some embodiments, process 900 may be performed by various components of wireless communication device 500. The following description is of process 900 with respect to one embodiment of wireless communication device 500. It should be noted that process 900 may be performed by other wireless communication devices and the steps of process 900 may be performed by components other than those described below.

At a block 902, PBPC generator 512 generates a PBPC based on an estimated power level needed for an uplink power transmission over the second air interface. Step 902 may be similar in some embodiments to step 802. Next at a step 904, the PBPC generator 512 biases (i.e. adjusts) the PBPC based on the first power level used for transmission over the first air interface. For example, in an embodiment the PBPC may be reduced by the first power level. In another embodiment, the PBPC may be reduced by another amount based on the first power level, the rate of change of the first power level over time, the direction of change of the first power level over time, and/or reverse link power control commands received at the wireless communication device. Next, at block 906, transceiver 512 transmits the PBPC to an access point.

In an embodiment, access point 600 receives the PBPC. Transmission scheduler 602 may then select uplink scheduling parameters based on the received PBPC. The access point 600 may then transmit the transmission schedule and/or uplink schedule parameters to the wireless communication device that sent the PBPC. Accordingly, the schedule indicates the power level and timing of when the wireless communication device should transmit to the access point. The schedule may be set such that the overall transmit power for transmitting over the first air interface and the second air interface does not exceed a threshold level as described with respect to FIG. 7.

While the specification describes particular examples of the present invention, those of ordinary skill can devise variations of the present invention without departing from the inventive concept. For example, the teachings herein refer to circuit-switched network elements but are equally applicable to packet-switched domain network elements.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method for power management for a mobile device supporting simultaneous transmission on multiple air interfaces, the method comprising:

determining a first power level used for transmission over a first air interface;

determining a second power level used for transmission over a second air interface;

comparing a composite of the first power level and the second power level to a threshold power level;

adjusting the second power level based on the comparison;

generating at least one power head room report based on at least one of the first power level and the adjusted second power level; and transmitting the at least one power head room report.

2. The method of claim 1, wherein adjusting the second power level comprises adjusting the second power level so the sum of the first power level and the second power level is less than or equal to the threshold power level.

3. The method of claim 1, further comprising adjusting the first power level based on the comparison, and wherein the composite of the adjusted first power level and the adjusted second power level is less than or equal to the threshold power level.

4. The method of claim 1, wherein the first air interface is prioritized over the second air interface for power allocation.

5. The method of claim 1, wherein transmitting the at least one power head room report, comprises transmitting a first power head room report over the first air interface and transmitting a second power head room report over the second air interface.

6. A mobile device supporting simultaneous transmission on multiple air interfaces, the mobile device comprising:

a first interface power calculator configured to determine a first power level used for transmission over a first air interface;

a second interface power level calculator configured to determine a second power level used for transmission over a second air interface;

a threshold check unit configured to compare a composite of the first power level and the second power level to a threshold power level;

a power controller configured to adjust the second power level based on the comparison;

a power based payload constraint generator configured to generate at least one power head room report based on at least one of the first power level and the adjusted second power level; and at least one transceiver configured to transmit the at least one power head room report.

7. The mobile device of claim 6, wherein the power controller is further configured to adjust the second power level by adjusting the second power level so the sum of the first power level and the second power level is less than or equal to the threshold power level.

8. The mobile device of claim 6, wherein the power controller is further configured to adjust the first power level based on the comparison, and wherein the composite of the adjusted first power level and the adjusted second power level is less than or equal to the threshold power level.

9. The mobile device of claim 6, wherein the first air interface is prioritized over the second air interface for power allocation.

10. The mobile device of claim 6, wherein the at least one transceiver is further configured to transmit the at least one power head room report, comprises transmitting a first power head room report over the first air interface and transmitting a second power head room report over the second air interface.

11. A computer program product, comprising:

computer-readable medium comprising:

code for causing a computer to determine a first power level used for transmission over a first air interface;

code for causing a computer to determine a second power level used for transmission over a second air interface;

code for causing a computer to compare a composite of the first power level and the second power level to a threshold power level;

code for causing a computer to adjust the second power level based on the comparison;

code for causing a computer to generate at least one power head room report based on at least one of the first power level and the adjusted second power level; and code for causing a computer to transmit the at least one power head room report.

12. A system for power management for a mobile device supporting simultaneous transmission on multiple air interfaces, the system comprising:

means for determining a first power level used for transmission over a first air interface;

means for determining a second power level used for transmission over a second air interface;

means for comparing a composite of the first power level and the second power level to a threshold power level;

means for adjusting the second power level based on the comparison;

means for generating at least one power head room report comprising based on at least one of the first power level and the adjusted second power level; and means for transmitting the at least one power head room report.

* * * * *